C. F. TODT.
GRAIN LOADER.
APPLICATION FILED NOV. 26, 1917.
1,366,435.
Patented Jan. 25, 1921.
2 SHEETS—SHEET 1.
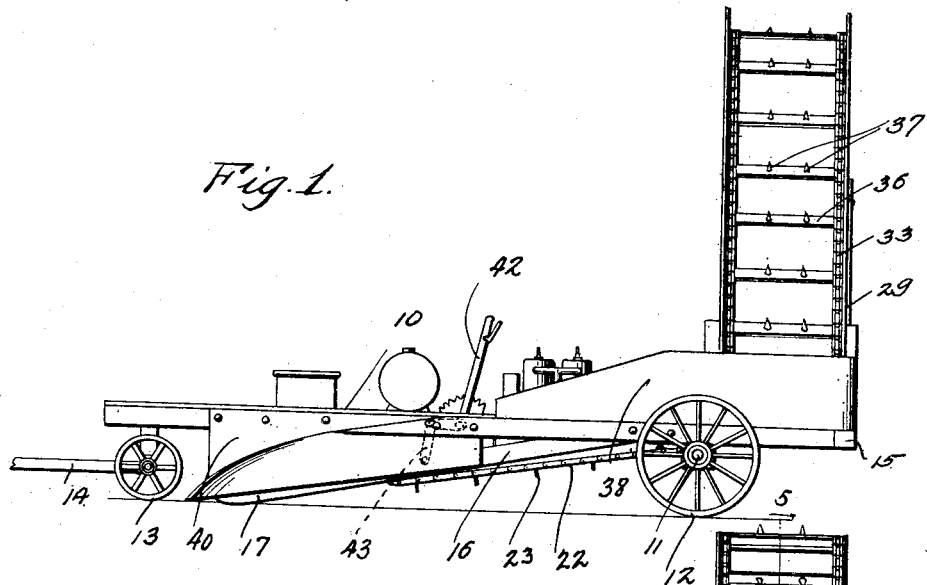
Fig. 1.
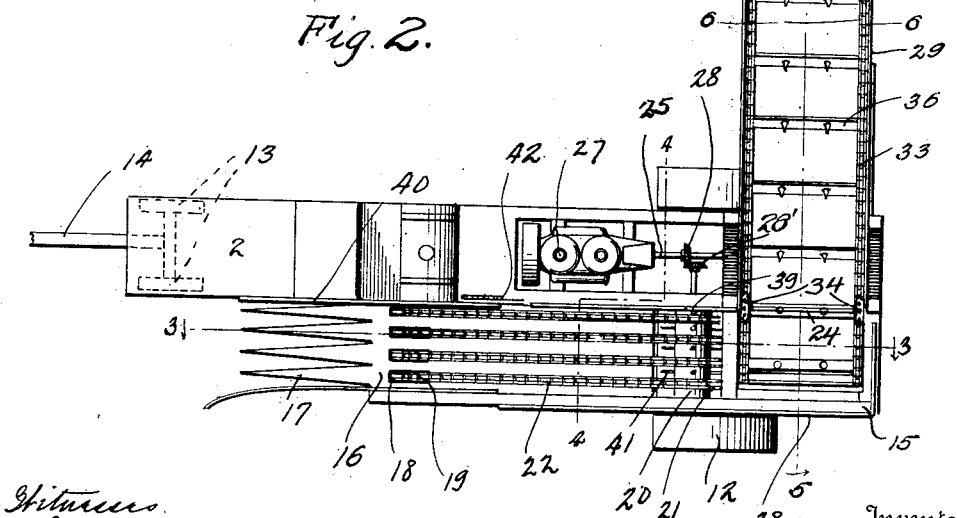
Fig. 2.
Inventor
C. F. Todt.
Attorney

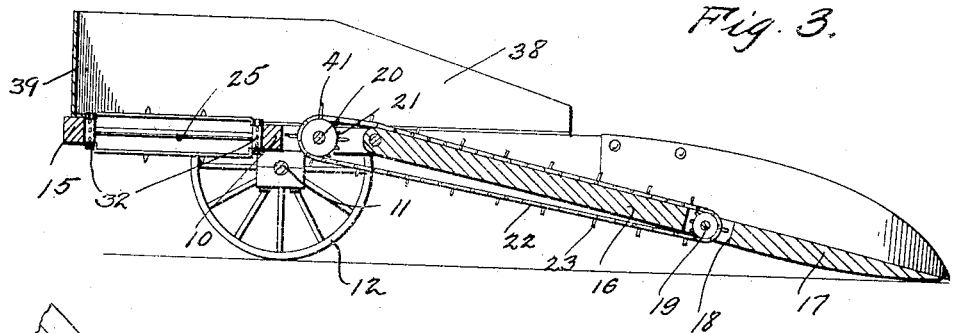
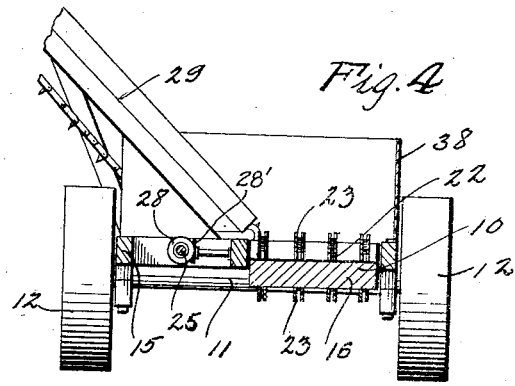
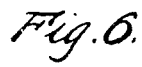
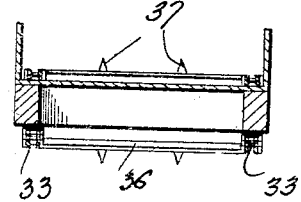
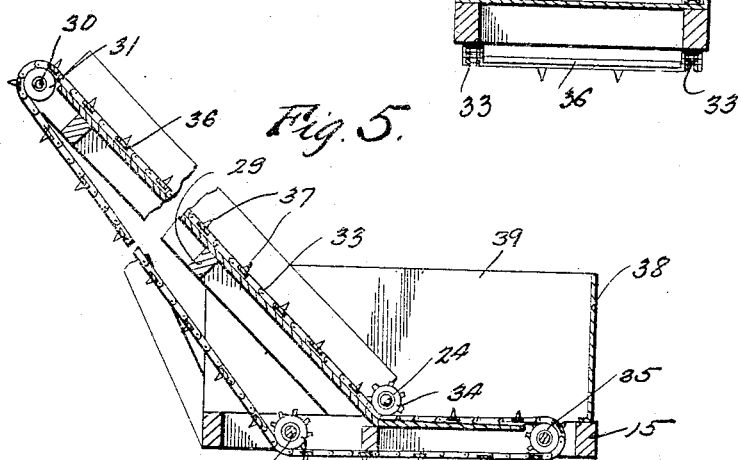

UNITED STATES PATENT OFFICE.

CLARENCE F. TODT, OF MORRISONVILLE, ILLINOIS.

GRAIN-LOADER.

1,366,435.  Specification of Letters Patent.  Patented Jan. 25, 1921.

Application filed November 26, 1917. Serial No. 203,956.

*To all whom it may concern:*

Be it known that I, CLARENCE F. TODT, a citizen of the United States, residing at Morrisonville, in the county of Christian, State of Illinois, have invented certain new and useful Improvements in Grain-Loaders; and I do hereby declare the following to be a full, clear, and exact description of the invention, such as will enable others skilled in the art to which it appertains to make and use the same.

This invention relates to new and useful improvements in loading devices, and particularly to devices for loading grain which is to be carried to the thresher.

One object of the present invention is to provide an improved form of gathering means whereby the sheaves of grain will be effectively lifted and carried into the wagon which moves at the side of the machine.

Another object is to provide a novel and improved device of this character which is adapted to be drawn by animals but wherein the gathering and conveying mechanisms are motor driven.

Other objects and advantages will be apparent from the following description when taken in connection with the accompanying drawing.

In the drawing:

Figure 1 is a side elevation of my improved grain gatherer and loader.

Fig. 2 is a top plan view of the same.

Fig. 3 is an enlarged vertical longitudinal section view taken on the line 3—3 of Fig. 2.

Fig. 4 is a transverse sectional view taken on the line 4—4 of Fig. 2.

Fig. 5 is a sectional view taken on the line 5—5 of Fig. 2.

Fig. 6 is a sectional view taken on the line 6—6 of Fig. 2.

Referring particularly to the accompanying drawings, 10 represents a horizontal frame which is provided with the transverse axle having the ground engaging wheels thereon, as at 11 and 12, respectively. The forward portion of the frame is supported by the wheels 13, and also has a tongue or pole 14 for attachment of draft animals. Extending laterally from the rear portion of the frame 10 is a frame 15, the outer side thereof, extending forwardly in parallel relation to the adjacent side of the frame 10. Extending between and supported on this projecting portion of the frame 15 and the adjacent side of the frame 10, is a shaft 16', on which is mounted a vertically swingable platform 16, the same being normally in a downwardly and forwardly inclined position, as clearly seen in Fig. 1. The forward end of the platform 16 is formed with the raking tines or fingers 17 which gather up the sheaves of grain and lift them upwardly toward the platform. In the platform, rearwardly of the inner ends of the fingers, are formed the openings 18, and mounted in these openings are the sprocket wheels 19. At the upper end of the platform, and rotatably mounted in the frame 15, is a transverse shaft 20 on which is carried a drum 15', and mounted on this drum are sprockets 21, the number being equal to the sprockets 19. Over these sprockets 19 and 21 are engaged the sprocket chains 22, the same having the vertically extending retaining fingers 23 which hold the grain while being carried upwardly. Extending longitudinally in the rear portion of the frame 10, are the shafts 24 and 25, the former being arranged above and slightly offset from the latter, as shown. Carried by the forward end of the shaft 25 is a bevel pinion 28 which meshes with a similar pinion 28' on the adjacent end of the shaft 20. Secured to the outer side of the rear portion of the frame 10 is an upwardly and laterally extending elevator chute 29. In the upper end of this chute is mounted a transverse shaft 30 on which are mounted the pulleys 31, while on the shaft 25 are the sprocket wheels 32. Engaged around these sprockets 31 and 32 are the chains 33 the upper lap of same passing under sprocket wheels 34 mounted on the shaft 24, at the lower end of the chute. At the sides of the outer end of the frame 15 are the similar sprockets 35, around which the said chains are also engaged. Connecting the chains 33 are the transverse slats 36 which are each provided with a plurality of outwardly extending pins 37 to grip the grain and carry the same up the chute. On the rear and outer side of the frame 15 there are mounted the guards 38 which prevent the grain being lost from the conveyer belt. A similar guard is mounted at 39. A depending guard 40 is carried by the inner side of the frame 10, adjacent the raking tines or fingers 17.

In the operation of the device the same is drawn over the field by the draft animals, while at the same time the engine is set in motion. The engine drives the conveyer belts or chains, and the gathering chains of the gathering platform, which carry the sheaves of grain upwardly onto the conveyer belts and upwardly into the wagon at the side of the machine.

On the drum 15', between the sprockets are secured the radially extending fingers 41 which assist in lifting the grain onto the lower or horizontal portion of the conveyer belt. Thus as the machine proceeds the sheaves will be gathered up and conveyed into the wagon.

On the frame 10 there is pivotally mounted a lever 42 which is connected to the swinging platform by means of the link 43, whereby the operator can raise and lower said platform in accordance with the condition of the ground over which the machine is operated.

What is claimed is:

In a grain loader, the combination with a frame having its forward end open and with side guard walls, of a transverse shaft mounted in the frame at the inner end thereof a drum on the shaft having a plurality of spaced sprockets thereon the drum having circular series of radiating teeth between the sprockets, a transverse shaft mounted in advance of the drum, a platform pivotally supported at its inner end on the last named shaft and extending forwardly through the open end of the frame where it is formed with gathering fingers, a shaft rotatably supported transversely in the forward end of the platform, said platform having longitudinal parallel slots at its inner and outer ends, and conveying chains engaged around the said shafts and through said slots and having their upper laps riding on the upper face of the platform, and means for adjusting the platform on its pivot.

In testimony whereof I affix my signature in the presence of two witnesses.

CLARENCE F. TODT.

Witnesses:
F. B. PEARSON,
H. ELMER TODT.